US012626022B2

(12) United States Patent
Ahn et al.

(10) Patent No.: US 12,626,022 B2
(45) Date of Patent: May 12, 2026

(54) METHODS, COMPUTER DEVICES, AND NON-TRANSITORY COMPUTER-READABLE RECORD MEDIA FOR LEARNING OF WATERMARKING MODEL USING COMPLEX ATTACK

(71) Applicant: NAVER WEBTOON Ltd.,
Seongnam-si (KR)

(72) Inventors: Wonhyuk Ahn, Seongnam-si (KR);
Choong Hyun Seo, Seongnam-si (KR);
Seung-Hun Nam, Seongnam-si (KR);
Ji Hyeon Kang, Seongnam-si (KR)

(73) Assignee: NAVER WEBTOON Ltd.,
Gyeonggi-do (KR)

( * ) Notice: Subject to any disclaimer, the term of this patent is extended or adjusted under 35 U.S.C. 154(b) by 0 days.

(21) Appl. No.: 18/797,912

(22) Filed: Aug. 8, 2024

(65) Prior Publication Data

US 2025/0061237 A1 Feb. 20, 2025

(30) Foreign Application Priority Data

Aug. 18, 2023 (KR) ........................ 10-2023-0108569

(51) Int. Cl.
*G06F 21/64* (2013.01)
*G06N 20/00* (2019.01)

(52) U.S. Cl.
CPC ............. *G06F 21/64* (2013.01); *G06N 20/00* (2019.01)

(58) Field of Classification Search
CPC ................................ G06F 21/64; G06N 20/00

USPC .......................................................... 726/26
See application file for complete search history.

(56) References Cited

U.S. PATENT DOCUMENTS

| | | | | |
|---|---|---|---|---|
| 10,891,352 B1* | 1/2021 | Hane | ........................ | G06F 40/30 |
| 11,669,601 B2* | 6/2023 | Jalali | ........................ | G06F 21/16 726/26 |
| 2019/0205508 A1* | 7/2019 | Poddar | ..................... | G06F 21/16 |
| 2021/0034721 A1* | 2/2021 | Bos | ......................... | G06N 3/082 |
| 2021/0092132 A1* | 3/2021 | Bhatia | ................. | H04L 63/1416 |
| 2023/0353595 A1* | 11/2023 | Hu | .......................... | G06N 3/045 |

FOREIGN PATENT DOCUMENTS

KR 10-2009-0109849 A 10/2009

* cited by examiner

*Primary Examiner* — Teshome Hailu
(74) *Attorney, Agent, or Firm* — Harness, Dickey & Pierce, P.L.C.

(57) ABSTRACT

Disclosed are a method, a computer device, and a non-transitory computer-readable record medium for learning of a watermarking model. A watermarking model learning method may include dividing, by the at least one processor, epochs for learning of a watermarking model into at least two stages, setting, by the at least one processor, at least one target attack type to each stage among the at least two stages, the setting includes setting a first threshold number of the at least one target attack type set to an earlier stage to be greater than a second threshold number of the at least one target attack type set to a later stage, and the at least two stages including the earlier stage and the later stage, and performing, by the at least one processor, learning of the watermarking model based on the at least two stages and the setting.

16 Claims, 6 Drawing Sheets

FIG. 3

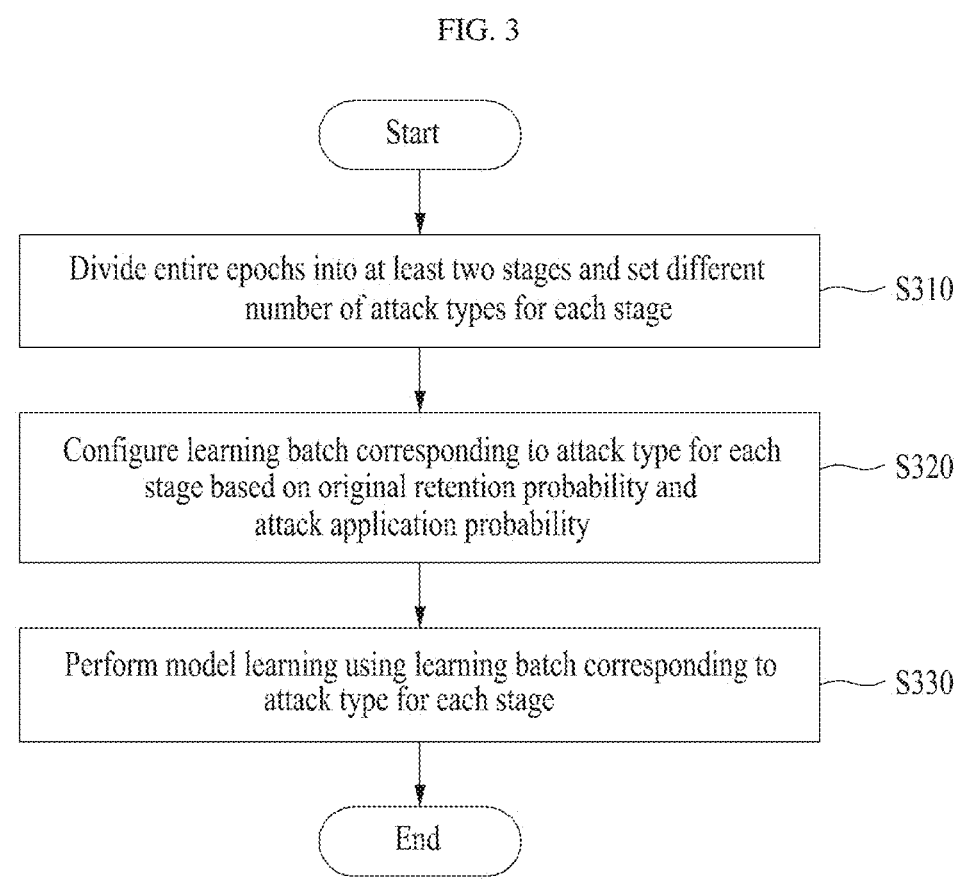

```
                    ┌─────────────┐
                    │    Start    │
                    └─────────────┘
                           │
                           ▼
   ┌─────────────────────────────────────────────────┐
   │ Divide entire epochs into at least two stages    │ ─── S310
   │ and set different number of attack types for     │
   │ each stage                                       │
   └─────────────────────────────────────────────────┘
                           │
                           ▼
   ┌─────────────────────────────────────────────────┐
   │ Configure learning batch corresponding to        │ ─── S320
   │ attack type for each stage based on original     │
   │ retention probability and attack application     │
   │ probability                                      │
   └─────────────────────────────────────────────────┘
                           │
                           ▼
   ┌─────────────────────────────────────────────────┐
   │ Perform model learning using learning batch      │ ─── S330
   │ corresponding to attack type for each stage      │
   └─────────────────────────────────────────────────┘
                           │
                           ▼
                    ┌─────────────┐
                    │     End     │
                    └─────────────┘
```

Figure 4:
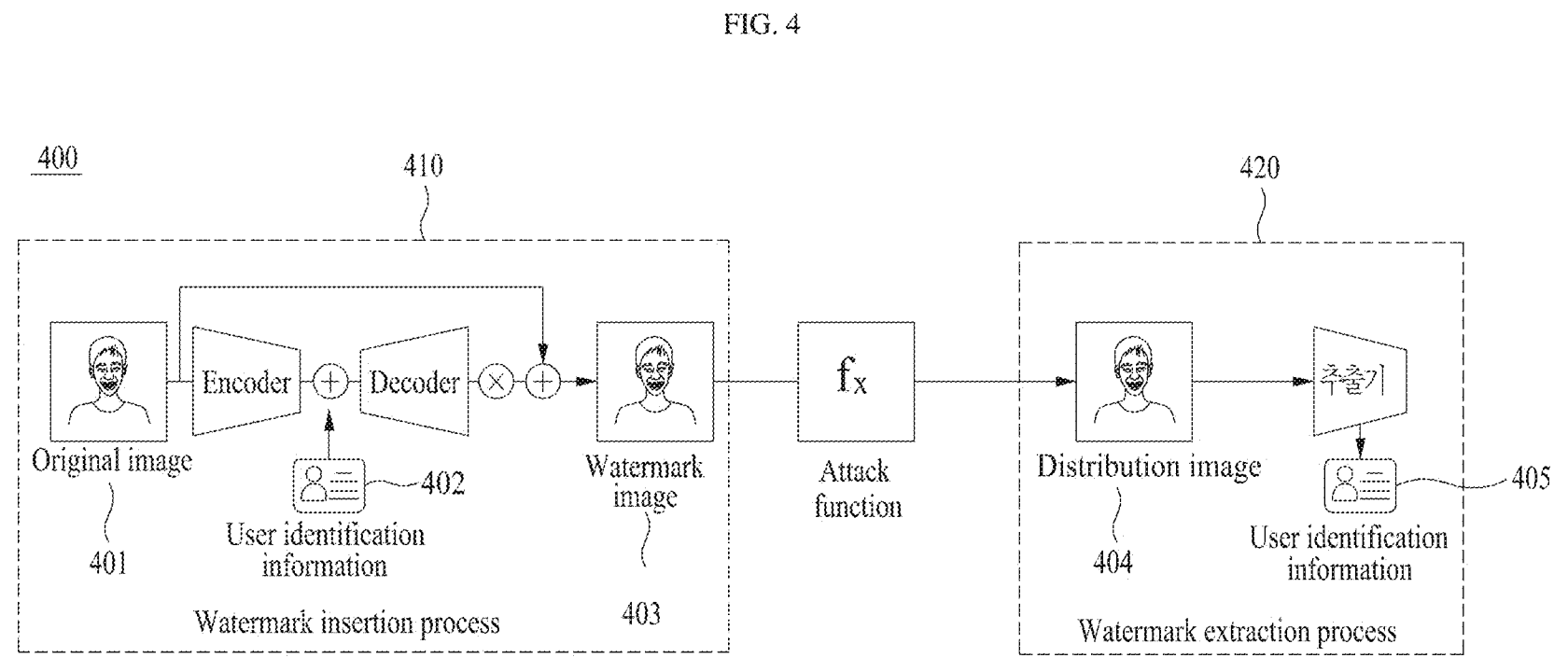

Distribution image

User identification
information

Watermark extraction process

조추기

$f_x$

Attack
function

403

Watermark
image

Encoder

Decoder

402

User identification
information

Watermark insertion process

401

Original image

METHODS, COMPUTER DEVICES, AND NON-TRANSITORY COMPUTER-READABLE RECORD MEDIA FOR LEARNING OF WATERMARKING MODEL USING COMPLEX ATTACK

CROSS-REFERENCE TO RELATED APPLICATION(S)

This U.S. non-provisional application claims the benefit of priority under 35 U.S.C. § 119 to Korean Patent Application No. 10-2023-0108569, filed Aug. 18, 2023, the entire contents of which are incorporated herein by reference in their entirety.

BACKGROUND

Technical Field

Some example embodiments relate to technology for improving invisibility and robustness of a watermark image.

Related Art

Digital watermarking refers to technology that non-perceptually inserts and extracts additional information, such as copyright information, into and from digital content, such as image, audio, and video. Currently, much research on digital watermarking is being conducted.

In general, an image watermarking method employs a method of inserting a watermark into a spatial domain or a frequency domain of an image, and estimating a watermark signal in an insertion area using a specific filter during extraction.

Comparing watermark insertion between the spatial domain and the frequency domain, when a watermark is inserted in the spatial domain, the watermark has a sensitive characteristic even to relatively ordinary image distortion. Therefore, watermarks inserted in the spatial domain of, for example, an image or video, are insufficiently robust.

On the other hand, when the watermark is inserted after converting an image to the frequency domain, the watermark is more robust to image distortion as compared to a general case of using the spatial domain. However, depending on a position at which the watermark is inserted, the robustness of the watermark is greatly effected along with degradation in image quality.

Watermarks are extractable from a digitally watermarked image wiener filter.

SUMMARY

Some example embodiments provide learning technology that may maximize (or increase) robustness against a target attack while minimizing (or reducing) degradation in invisibility of a watermark image.

Some example embodiments provide learning technology that may prevent (or reduce) degradation in invisibility using an attack sample to which a target attack is applied and an original sample to which the target attack is not applied.

Some example embodiments provide learning technology that may improve robustness against attack by applying a single attack in an initial stage of learning and by gradually applying a complex attack with the progress of learning.

According to some example embodiments, there is provided a watermarking model learning method executed by a computer device, the computer device including at least one processor configured to execute computer-readable instructions stored in a memory, and the watermarking model learning method comprise dividing, by the at least one processor, epochs for learning of a watermarking model into at least two stages, setting, by the at least one processor, at least one target attack type to each stage among the at least two stages, the setting includes setting a first threshold number of the at least one target attack type set to an earlier stage to be greater than a second threshold number of the at least one target attack type set to a later stage, and the at least two stages including the earlier stage and the later stage, and performing, by the at least one processor, learning of the watermarking model based on the at least two stages and the setting.

According to some example embodiments, the first threshold number may be one, the earlier stage may be an initial stage in which learning starts, and the second threshold number may be at least two.

According to some example embodiments, the setting may include randomly selecting the at least one target attack type from an attack type list according to a respective threshold number of the at least one target attack type of each corresponding stage among the at least two stages.

According to some example embodiments, the watermarking model learning method may further include configuring, by the at least one processor, a respective learning batch corresponding to the at least one target attack type set to each corresponding stage among the at least two stages.

According to some example embodiments, the configuring may include configuring the respective learning batch to include an original sample and an attack sample, the configuring being based on an original retention probability and an attack application probability, the original sample may be a learning sample to which a first target attack type among the at least one target attack type is not applied, and the attack sample may be a learning sample to which the first target attack type is applied.

According to some example embodiments, the configuring may include selecting learning samples through random sampling from a dataset, and generating an attack sample by applying a first target attack type among the at least one target attack type to at least one of the learning samples.

According to some example embodiments, the configuring may include randomly setting target parameters within a parameter range of a first target attack type among the at least one target attack type as learning samples to which the first target attack type is applied to obtain the respective learning batch.

According to some example embodiments, the configuring may include configuring the respective learning batch by generating a learning sample to which the at least one target attack type set to the later stage is applied.

According to some example embodiments, the configuring may include configuring the respective learning batch by generating a plurality of learning samples to which at least two target attack types are applied, at least one of a combination of the at least two target attack types or an application order of the at least two target attack types being different among the plurality of learning samples.

According to some example embodiments, the configuring may include configuring the respective learning batch by replacing a non-differentiable attack type with a differentiable attack type based on an approximation function, the non-differentiable attack type being among the at least one target attack type.

According to some example embodiments, there is provided a non-transitory computer-readable recording medium storing program instructions that, when executed by at least one processor, cause the processor to perform the watermarking model learning method.

According to some example embodiments, there is provided a computer device including at least one processor configured to execute computer-readable instructions included in a memory to cause the computer device to divide epochs for learning of a watermarking model into at least two stages, set at least one target attack type to each stage among the at least two stages, set a first threshold number of the at least one target attack type set to an earlier stage to be greater than a second threshold number of the at least one target attack type set to a later stage, and the at least two stages including the earlier stage and the later stage, and perform learning of the watermarking model based on the at least two stages, the at least one target attack type set to each stage among the at least two stages, the first threshold number and the second threshold number.

According to some example embodiments, it is to maximally prevent degradation (or provide a greater reduction in degradation) in visibility of a watermark image by training a watermarking model using an attack sample to which a target attack is applied and an original sample to which the target attack is not applied together.

According to some example embodiments, it is possible to train a watermarking model by applying a single attack in an initial stage of learning and by gradually applying a complex attack with the progress of learning, and to accordingly, maximize (or increase) robustness of a watermark image.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 3 is a flowchart illustrating an example of a method performed by a computer device according to some example embodiments;

FIG. 4 illustrates an example of an entire structure of a watermarking model according to some example embodiments; and FIGS. 5 and 6 illustrate examples of a target attack for learning of a watermarking model according to some example embodiments.

DETAILED DESCRIPTION

Figure 1:
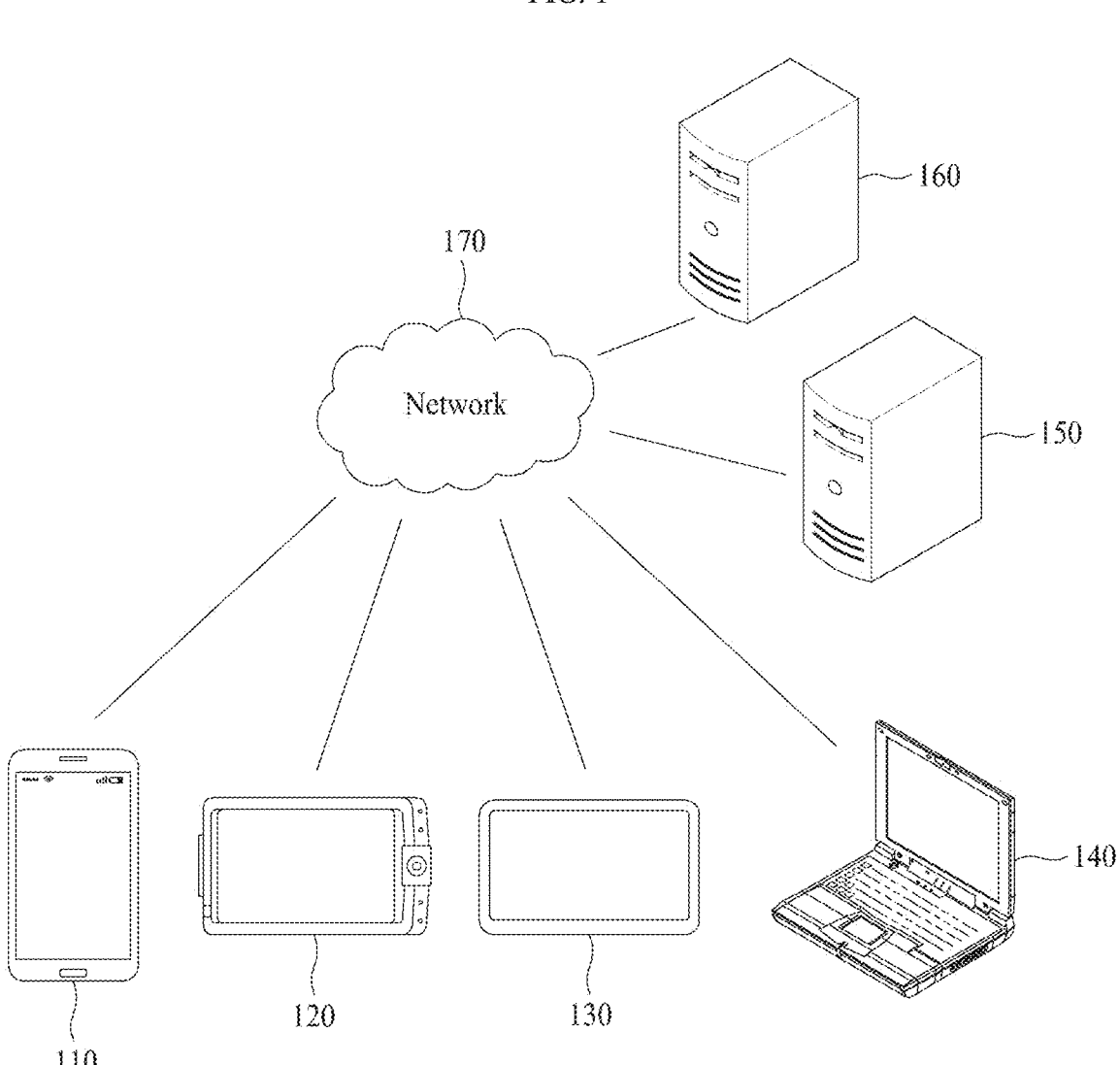
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may provide for one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for improving invisibility and robustness of a watermark image.

Some example embodiments including disclosures herein may provide learning methodology that maximizes (or increases) robustness against a target attack while minimizing (or reduces) degradation in invisibility of a watermark image.

A watermarking model learning system according to some example embodiments may be implemented by at least one computer device. A watermarking model learning method according to some example embodiments may be performed by at least one computer device included in the watermarking model learning system. Here, a computer program according to some example embodiments may be installed and run on the computer device and the computer device may perform the watermarking model learning method according to some example embodiments under control of the computer program. The aforementioned computer program may be stored in a non-transitory computer-readable record medium to implement the watermarking model learning method in conjunction with the computer device.

FIG. 1 illustrates an example of a network environment according to some example embodiments. Referring to FIG. 1, the network environment may include a plurality of electronic devices 110, 120, 130, and/or 140, a plurality of servers 150 and 160, and/or a network 170. FIG. 1 is provided as an example only. The number of electronic devices, and/or the number of servers, is not limited thereto. Also, the network environment of FIG. 1 is provided as one example of environments applicable to some example embodiments and an environment applicable to some example embodiments is not limited to the network environment of FIG. 1.

Each of the plurality of electronic devices 110, 120, 130, and/or 140 may be a fixed terminal or a mobile terminal that is configured as a computer device. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer devices capable of communicating with other electronic devices 120, 130, and/or 140, and/or the servers 150 and 160, over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), the Internet, etc. Also, the network 170 may include at least one of network topologies that include a bus network, a star network, a ring network, a mesh network, a star-bus network, a tree or hierarchical network, and the like. However, these are provided as examples only.

Each of the servers 150 and 160 may be configured as a computer device or a plurality of computer devices that provides an instruction, a code, a file, content, a service, etc., through communication with the plurality of electronic devices 110, 120, 130, and/or 140 over the network 170. For example, the server 150 may be a system that provides a service, for example, a content copy prevention service, to the plurality of electronic devices 110, 120, 130, and/or 140 connected over the network 170.

Figure 2:
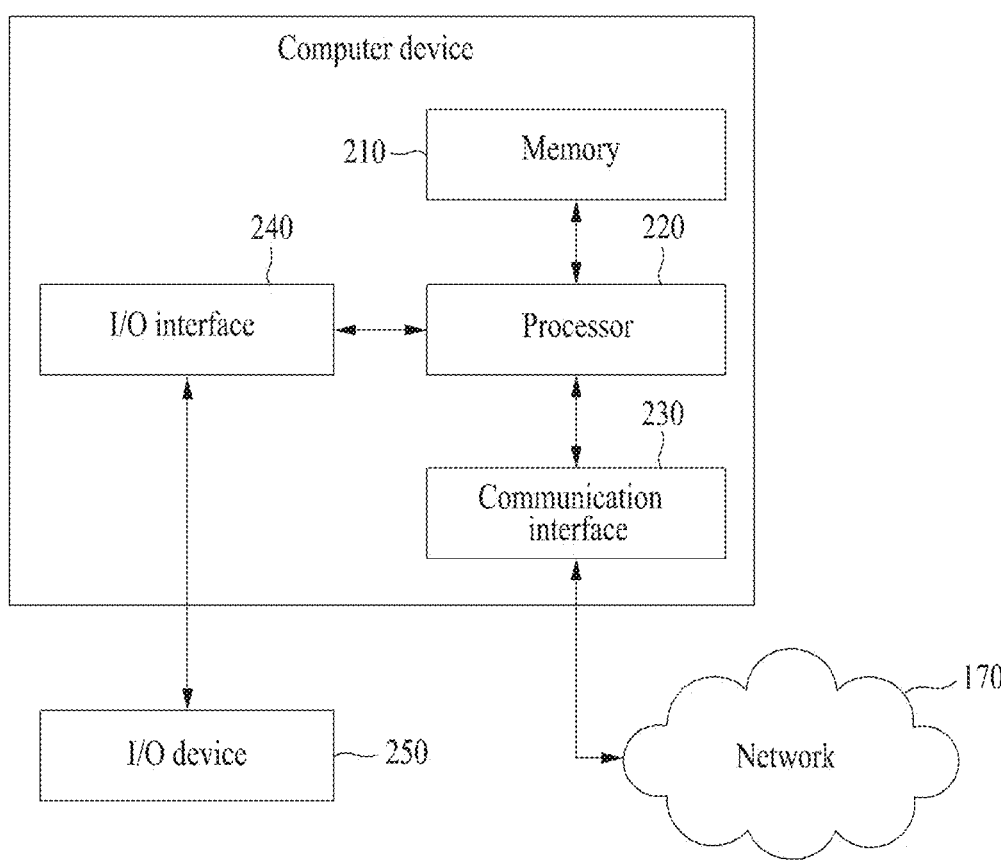
FIG. 2 is a diagram illustrating an example of a computer device according to some example embodiments.

FIG. 2 is a block diagram illustrating an example of a computer device according to some example embodiments. Each of the plurality of electronic devices 110, 120, 130, and/or 140, and/or each of the servers 150 and/or 160, may be implemented by a computer device 200 of FIG. 2.

Referring to FIG. 2, the computer device 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as a ROM and a disk drive, may be included in the computer device 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include, for example, a floppy drive, a disk, a tape, a DVD/CD-ROM drive, a memory card, etc. According to some example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the computer device 200 and another apparatus, for example, the aforementioned storage devices, over the network 170. For example, the processor 220 of the computer device 200 may forward a request or an instruction created based on a program code stored in the storage device (such as the memory 210), data, and/or a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to some example embodiments, the computer device 200 may include a greater or smaller number of components than the number of components of FIG. 2. However, some conventional components may not be illustrated in detail. For example, the computer device 200 may be configured to include at least a portion of the I/O device 250 or may further include other components, such as a transceiver and/or a database.

Hereinafter, some example embodiments of a method and apparatus for learning of a watermarking model using a complex attack are described.

Some example embodiments relate to watermarking technology that non-perceptually inserts and extracts additional information, such as copyright or user identification information, into and from digital content in various forms, such as image, audio, and video.

In particular, the watermarking technology herein may represent technology that inserts and extracts additional information, such as invisibility (e.g., invisible information), capable of identifying a user by specifying an identifier (ID) or a download time in a distribution process of digital content to prevent (or reduce) illegal copying of the digital content.

The watermarking technology according to some example embodiments may be applied to a variety of digital contents distributed over the Internet, such as webtoons and web novels and, particularly, may employ a method of individually inserting user identification information for watermarking for each unit page (or unit frame), and a method of dividing and sequentially inserting user identification information across a plurality of pages. For example, in the case of a webtoon that includes a plurality of cuts, the entire user ID may be inserted for each individual cut at once and the user ID may be inserted into a plurality of cuts one letter by one letter (e.g., inserting each respective letter among the letters of the entire user ID sequentially into the plurality of cuts such that each cut includes less than the entirety of the user ID).

This watermark image may need to (or should) ensure (or be configured to provide for) invisibility and robustness of a watermark in that the watermark may be subject to various attacks during a distribution process.

The existing studies often train the watermarking model for a single specific attack type. In this case, it is difficult to expect robustness against an attack type not used during learning.

Therefore, some example embodiments may provide a complex attack learning method for training a watermarking model for complex attacks of various combinations or order as learning methodology of minimizing (or reducing) degradation in visibility of a watermark image and maximizing (or increasing) robustness against a target attack.

The computer device 200 according to some example embodiments may provide a client with a content copy prevention service through connection to an exclusive application installed on the client or a website/mobile site related to the computer device 200. A computer-implemented watermarking model learning system may be configured in the computer device 200. For example, the watermarking model learning system may be implemented in the form of a program that independently operates or may be configured in an in-app form of a specific application to be operable on the specific application.

The processor 220 of the computer device 200 may be implemented as a component to perform the following watermarking model learning method. According to some example embodiments, components of the processor 220 may be selectively included in or excluded from the processor 220. Also, according to some example embodiments, the components of the processor 220 may be separated or merged for functional representation of the processor 220.

The processor 220 and the components of the processor 220 may control the computer device 200 to perform operations included in the following watermarking model learning method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read a necessary (or given) instruction from the memory 210 to which instructions related to control of the computer device 200 are loaded. In this case, the read instruction may include an instruction for controlling the processor 220 to perform operations included in the following watermarking model learning method.

Operations included in the watermarking model learning method may be performed in order different from illustrated order. Some of the operations may be omitted or an additional process may be further included.

Operations included in the watermarking model learning method may be performed by the server 150. According to some example embodiments, at least some of the operations may be performed by the client.

FIG. 3 is a flowchart illustrating an example of a method performed by a computer device according to some example embodiments.

Referring to FIG. 3, in operation S310, the processor 220 may divide the entire epochs for learning (e.g., an entire number of iterations) of a watermarking model into at least two stages and may configure the different number of attack types as target attacks to be applied for each stage. According to some example embodiments, a respective threshold number of target attack types may be set for each of the at least two stages such that each stage may learn the watermarking model using a number of different target attack types up to (e.g., less than or equal to) the threshold number set for that stage. According to some example embodiments, the number of different target attack types for each stage may be selected (e.g., randomly, pseudorandomly, based on an input from an external source/operator) from a list of attack types or dataset (including a plurality of different target attack types) up to the threshold number set for that stage. In an epoch of early learning, robustness against an easy attack is learned and as the model is trained, model robustness may be gradually learned by making an attack scheme more complex and difficult. For example, the processor 220 may set a single attack without applying the attack as a complex type (e.g., a threshold number of one) in an early learning stage and may set a complex attack by gradually increasing the maximum (or highest) number of attacks for an attack type to be learned in a subsequent learning stage. For example, assuming that the entire epochs are divided into three stages, the processor 220 may set the maximum (or highest) number of attacks (e.g., threshold number) to 1 in an initial stage in which learning starts, may set the maximum (or highest) number of attacks (e.g., threshold number) to 2 in a subsequent stage, stage 2, and may set the maximum (or highest) number of attacks (e.g., threshold number) to 3 in a last learning stage, stage 3. In the case of applying a strong attack at the beginning of learning, a model may be collapsed. Therefore, robust learning of applying a single attack in the initial stage of learning and then gradually applying a stronger attack may be provided.

In operation S320, the processor 220 may configure a learning batch corresponding to an attack type set to a corresponding stage, when configuring a learning batch for each stage of the entire epochs. According to some example embodiments, training data (e.g., training images, video, etc.) may be selected and configured to obtain the learning batch for each stage. In particular, the processor 220 may configure the learning batch through random sampling. According to some example embodiments, references to "random" made herein may also refer to "pseudorandom." Here, a portion of a predetermined (or alternatively, given) batch size may be configured with a learning sample to which a target attack is applied (hereinafter, referred to as 'attack sample') and the reset thereof may be configured with a learning sample to which the target attack is not applied (hereinafter, referred to as 'original sample'). Some example embodiments may maintain some of learning batches as original samples to which an attack is not applied for model learning having high invisibility to a watermark. An original retention probability representing a portion of original samples, and an attack application probability representing a portion of attack samples each to which a target attack is applied, among all samples for learning batch configuration may each be preset (or alternatively, given). The processor 220 may configure the learning batch that includes the original samples and the attack samples based on the original retention probability and the attack application probability. Some example embodiments may guarantee superiority of invisibility (e.g., may improve the invisibility of the watermark) over a learning model using only an attack sample since an original sample to which an attack is not applied is mixed (e.g., mixed into, or included in, the learning batch) even when configuring a learning batch of a strong attack.

In operation S330, the processor 220 may perform learning of the watermarking model using a learning batch corresponding to an attack type of a corresponding stage for each stage of the entire epochs. According to some example embodiments, references to learning of the watermarking model may refer to training the watermarking model. The processor 220 may gradually perform learning of the watermarking model. Here, the processor 220 may train the watermarking model without a model collapse phenomenon by initially performing learning using a single attack and then sequentially performing learning using various complex attacks. Robustness against an attack to a watermark may be acquired by sequentially configuring the number of attack types and attack combination order in a different manner depending on a learning stage. Also, degradation in invisibility of watermark may be prevented (or reduced) by performing learning using a batch in which samples, each with an applied target attack and original samples each without an applied attack, are mixed. According to some example embodiments, an original image is input into the learned watermarking model to apply a watermark (e.g., including user ID information) to the original image to obtain a watermark image. According to some example embodiments, a watermark image is input into the learned watermarking model to extract the information contained in the watermark (e.g., the user ID information).

FIG. 4 illustrates an example of the entire structure of a watermarking model according to some example embodiments.

Referring to FIG. 4, a watermarking model 400 may include a watermark inserter 410 and/or a watermark extractor 420.

The watermark inserter 410 serves to insert user identification information 402 into an original image 401 as a watermark and to generate a watermark image 403, and the watermark extractor 420 serves to extract user identification information 405 inserted as watermark from a distribution image 404 for the watermark image 403.

The watermark image 403 with the watermark inserted for the original image 401 is distributed. Here, the distribution image 404 may represent an image that is distributed with various attacks, such as arbitrarily editing the watermark image 403 with another image (e.g., an image found on website, such as an illegal site or site at which unlawful distribution and/or editing of copyrighted media is performed).

A loss function for learning of the watermarking model 400 may be defined as Equation 1 below.

$$\mathcal{L} = \lambda_{img\_mse}\mathcal{L}_{img\_mse} + \lambda_{vgg}\mathcal{L}_{vgg} + \lambda_{wm\_mse}\mathcal{L}_{wm\_mse} \qquad \text{[Equation 1]}$$

Here, $\lambda_{img\_mse}\mathcal{L}_{img\_mse} + \lambda_{vgg}\mathcal{L}_{vgg}$ denotes a first loss value for acquiring invisibility of watermark and $\lambda_{wm\_mse}\mathcal{L}_{wm\_mse}$ denotes a second loss value for acquiring robustness of watermark.

That is, a mean square error (MSE) between the original image 401 and the watermark image 403 may be used as the first loss value and an MSE between the user identification information 402 inserted into the original image 401 and the user identification information 405 extracted from the distribution image 404 may be used as the second loss value.

The invisibility and the robustness for the watermark may be learned uniformly. The processor 220 may perform learning of the watermarking model 400 in a way that minimizes (or reduces) degradation in the invisibility of the watermark through the first loss value and maximizes (or increases) the robustness of the watermark against a target attack through the second loss value.

In some example embodiments, the processor 220 may perform some operations (e.g., the operations described herein as being performed by the watermarking model 400) by artificial intelligence and/or machine learning. As an example, the processing circuitry may implement an artificial neural network (e.g., the watermarking model 400) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

Herein, the machine learning model (e.g., the watermarking model 400) may have any structure that is trainable, e.g., with training data. For example, the machine learning model may include an artificial neural network, a decision tree, a support vector machine, a Bayesian network, a genetic algorithm, and/or the like. The machine learning model will now be described by mainly referring to an artificial neural network, but some example embodiments are not limited thereto. Non-limiting examples of the artificial neural network may include a convolution neural network (CNN), a region based convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and/or the like.

Figure 5:
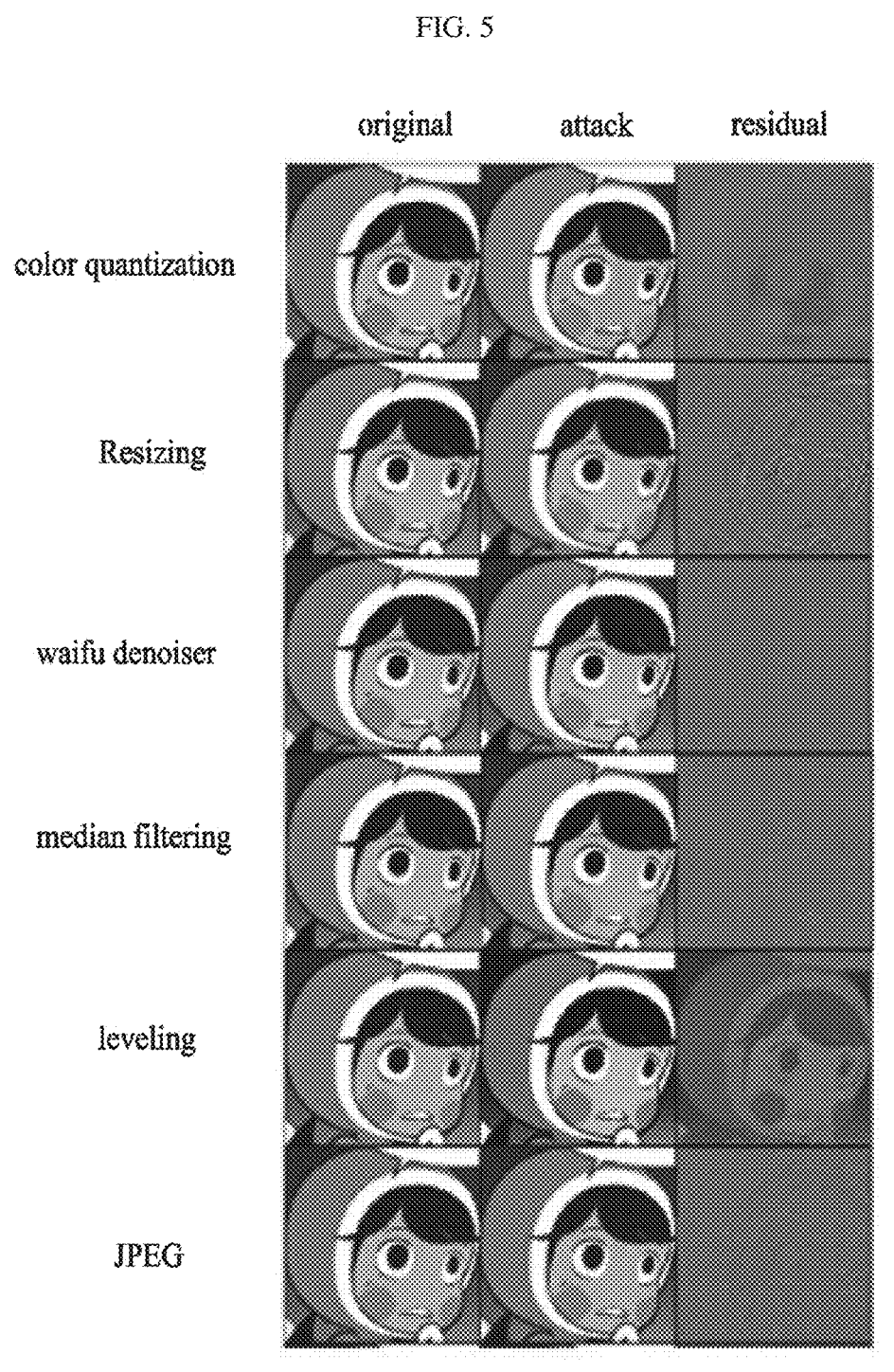
Figure 6:
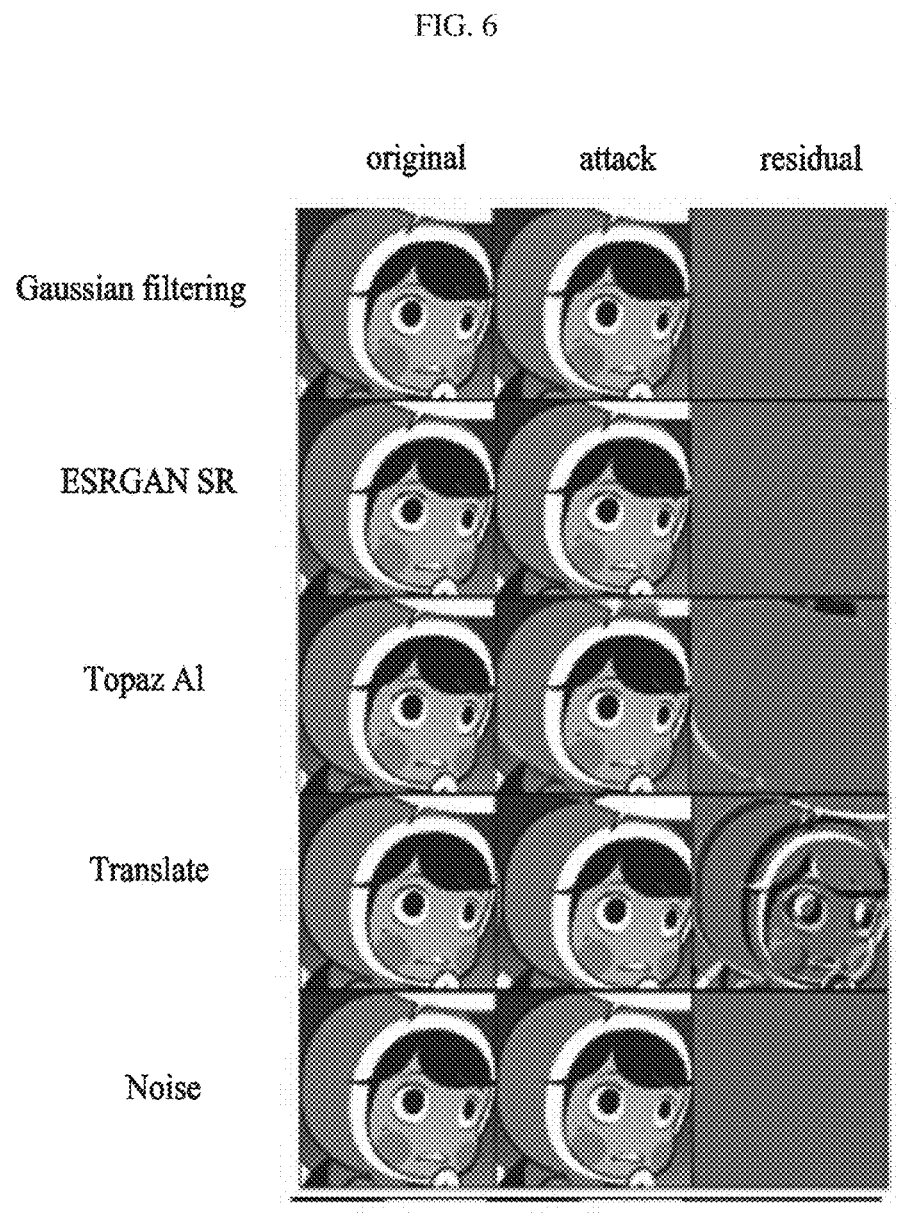

FIGS. 5 and 6 illustrate examples of a target attack for learning of a watermarking model according to some example embodiments.

Examples of a target attack against the watermark image 403 may include an image quality degradation attack, an image conversion attack, a neural network-based conversion attack, and the like.

For example, the image quality degradation attack may include JPEG (JPEG image compression technique), resizing (loss due to interpolation when converting an image size), Gaussian filtering (filtering with Gaussian window), color quantization (expressing an image by reducing the number of pixels), leveling (color correction with gamma correction after defining a maximum (or highest)/minimum (or lowest) pixel value), noise (noise addition), and the like. The image conversion attack may include Gaussian blur (filtering with Gaussian window), gamma correction (color change), median blur (filtering with median blurring), translate (x, y-axis transformation), and the like. The neural network-based conversion attack may include Waifu2x (waifu-based denoiser), RealESRGAN (ESRGAN-based denoiser and super resolution), ASNet (Topaz AI) (Topaz-based denoiser), and the like.

As an example of image application for each attack type, an original sample, an attack sample to which a target attack is applied, and a residual sample (image in which color values of the attack sample are subtracted from the original sample) are shown in FIGS. 5 and 6.

For simultaneous (or contemporaneous) learning of the watermark inserter 410 and the watermark extractor 420 included in the watermarking model 400, a differentiable target attack may be used. In the case of JPEG, color quantization, and leveling including a non-differentiable area (quantization, rounding, flooring, etc.) among attack types, a corresponding area may be replaced with a differentiable area using an approximation function of Equation 2 and applied. According to some example embodiments, in order to apply a target attack, in areas where differentiation is not possible, such as quantization, rounding, and flooring, an approximation function (e.g., Equation 2) may be used to change it into a differentiable area. Accordingly, a non-differentiable area may be changed into a differentiable area through an approximation.

$$[x]_{approx} = [x] + (x + [x])^3 \qquad \text{[Equation 2]}$$

Example of a pseudo code of a model learning method to maximally (or otherwise) secure (or improve) robustness against a target attack while minimizing (or reducing) degradation in visibility of watermark is as follows.

TABLE 1

```
n_epochs=100
batch_size=32
```

12

TABLE 1-continued

```
p1=0.5 # original retention probability
p2=0.5 # attack application probability
A={
    'JPEG': (20, 99), # JPEG QF range
    'resize': (0.3, 1.5), # resize scale range
    'leveling': (0, 50), # range of number of pixels to be leveled
    'translate': (-12, 12), # x, y pixel translation range
    'color_quantization': (8, 40), # range of number of pixel quantization
    'gamma': (0.3, 1.5), # gamma correction range
    'waifu2x': (0, 3), # waifu2x denoising level range
    'gaussian': (3, 5), # gaussian filtering window size range
    'median': (3, 5), # median filtering window size range
    'noise': (0.01, 0.04), # random noise std range
    # ... etc
}
num_attacked=int(batch_size*(1-p1)*p2)
for epoch in range(n_epochs):
    # maximum number of attacks applied
    if epoch <= n_epochs/3:
        a_n=1
    elif epoch <=2* n_epochs/3:
        a_n=2
    else:
        a_n=3
    data=sample_data(batch_size)
    attacked_data=data[:batch_size*(1-p1)]
    attacks=random.sample(list(A.item( )), a_n)
    for attack, (r1, r2) in attacks:
        param=random.uniform(r1,r2)
        data_index=random.sample(range(len(attacked_data)), num_attacked)
        attacked_data[data_index]=attack(attacked_data[data_index], param)
        # changed to attacked data
        data[:batch_size*(1-p1)]=attacked_data
        model.train(data)
```

Referring to the example of pseudo code of Table 1, the maximum (or highest) number of attacks for model learning in the entire epochs may be limited to 1 for epochs from a first epoch to ⅓ epochs (first learning stage), 2 for epochs from ⅓ epochs to ⅔ epochs (second learning stage), and 3 for remaining epochs (third learning stage).

The processor 220 may randomly (or pseudorandomly) select a sample index equal (or corresponding to) a batch size for each epoch through random (or pseudorandom) sampling from a dataset available for learning of the watermarking model. According to some example embodiments, processor 220 may randomly (or pseudorandomly) select sample indices until a number of samples is selected equal (or similar) to the batch size for each epoch (or learning stage).

The processor 220 may randomly (or pseudorandomly) select the number of attack types corresponding to the maximum (or highest) number of attacks in a corresponding learning stage from an attack type list for each learning stage. For example, the processor 220 may set one attack type, JPEG, as a target attack in a first learning stage and may set three attack types, JPEG, resize, and leveling, as target attacks in a third learning stage.

In the first learning state, among samples selected through random (or pseudorandom) sampling, the processor 220 may use samples corresponding to an original retention probability (p1) as the original, and may apply JPEG attack to samples corresponding to an attack application probability (p2) and use the same as attack samples. Here, the processor 220 may generate JPEG attack samples with different target parameters through a method of randomly (pseudorandomly) setting target parameters within the parameter range of a corresponding attack type for the JPEG attack. According to some example embodiments, the target parameter may be used to create an attack sample, and by randomly setting the target parameter within the parameter range of the attack type, various attack samples with different target parameters may be created.

Likewise, in the third learning stage, among samples selected through random (or pseudorandom) sampling, the processor 220 may use samples corresponding to the original retention probability (p1) as the original, and may apply at least one of target attacks, JPEG, resize, and leveling, to samples corresponding to the attack application probability (p2) and use the same as attack samples. Here, the processor 220 may generate attack samples by applying complex attacks in various combinations or order using up to three attack types. In the third learning stage, the processor 220 may generate a sample with only the JPEG attack applied, a sample with only the resize attack applied, a sample with only the leveling attack applied, a sample with the JPEG attack and the resize attack applied, a sample with the resize attack and the leveling attack applied, a sample with the JPEG attack and the leveling attack applied, and a sample with all of the JPEG, resize, and leveling attacks applied. In the case of applying a combination of at least two attack types, the processor 220 may generate an attack sample by varying the application order of attack types. For example, a sample to which the JPEG attack and the resize attack are applied may include a sample to which the JPEG attack is initially applied and then the resize attack is applied, and a sample to which the resize attack is initially applied and then the JPEG attack is applied. The processor 220 may generate attack samples with different target parameters for each attack type through a method of randomly setting a target parameter within the parameter range of a corresponding attack type for each of the JPEG attack, the resize attack, and/or the leveling attack. That is, as model learning progresses, the processor 220 may generate stronger attack samples by varying a combination of attack types and application order thereof as well as a target parameter in later stages of learning.

Therefore, the processor 220 may secure (or improve) robustness against an attack by training the watermarking model with a learning batch of easy attacks in an initial stage of learning, and by generating a learning batch of complex attacks and gradually training the watermarking model with the generated learning batch of complex attacks in later stages of learning.

In addition, when configuring a learning batch of various samples by varying a target parameter of an attack type and a combination or application order between attack types, it is possible to effectively prevent (or reduce) degradation in invisibility of a watermark by including an original sample to which an attack is not applied.

As described above, according to some example embodiments, it is possible to apply a single attack in an initial stage of learning and to gradually apply a complex attack with the progress of learning. Here, when configuring a learning batch for each epoch, it is possible to configure the learning batch by mixing an attack sample to which a target attack is applied and an original sample to which the target attack is not applied. Therefore, it is possible to implement learning methodology of maximizing (or increasing) robustness against a target attack while minimizing (or reducing) degradation in invisibility of a watermark image.

Conventional devices and methods for training a watermarking model for applying a watermark to an image train the watermarking model to apply a watermark that is resistant to distortion from a single type of attack. However, watermarks applied using such watermarking models are susceptible to distortion from attack types different from the single attack type based on which the watermarking models were trained. Accordingly, the conventional devices and methods fail to train a watermarking model capable to applying sufficiently robust watermarks.

However, according to some example embodiments, improved devices and methods are provided for training a watermarking model. For example, the improved devices and methods may train a watermarking model to apply a watermark that is resistant to distortion from multiple types of attacks. Also, the improved devices and methods may train the watermarking model according to increasing levels of complexity to reduce the potential for collapse of the watermarking model. Accordingly, the improved devices and methods may overcome the deficiencies of the conventional devices and methods to at least to train a watermarking model to apply more robust watermarks.

The apparatuses described above (e.g., the computer device 200) may be implemented using processing circuitry. The term 'processing circuitry,' as used in the present disclosure, may refer to, for example, hardware including logic circuits; a hardware/software combination such as a processor executing software; or a combination thereof. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of the processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, or a computer storage medium or device, to provide instructions or data to or being interpreted by the processing device. The software also may be distributed over network coupled computer systems such that the software is stored and executed in a distributed fashion. The software and data may be stored by one or more computer readable storage mediums.

The methods according to some example embodiments may be configured in a form of program instructions performed through various computer methods and recorded in non-transitory computer-readable media. Here, the media may continuously store computer-executable programs or may temporarily store the same for execution or download. Also, the media may be various types of recording devices or storage devices in a form in which one or a plurality of hardware components are combined. Without being limited to media directly connected to a computer device, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Also, examples of other media may include recording media and storage media managed by an app store that distributes applications or a site, a server, and the like that supplies and distributes other various types of software.

While this disclosure includes some example embodiments, it will be apparent to one of ordinary skill in the art that various alterations and modifications in form and details may be made therein without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other examples, and equivalents are within the scope of the following claims.

What is claimed is:

1. A watermarking model learning method executed by a computer device, the computer device including at least one processor configured to execute computer-readable instructions stored in a memory, and the watermarking model learning method comprises:

dividing, by the at least one processor, epochs for learning of a watermarking model into at least two stages;

setting, by the at least one processor, at least one target attack type to each stage among the at least two stages, the setting includes setting a first threshold number of the at least one target attack type set to an earlier stage to be greater than a second threshold number of the at least one target attack type set to a later stage, and the at least two stages including the earlier stage and the later stage; and performing, by the at least one processor, learning of the watermarking model based on the at least two stages and the setting, wherein model learning method further comprises configuring, by the at least one processor, a respective learning batch corresponding to the at least one target attack type set to each corresponding stage among the at least two stages, the configuring comprises configuring the respective learning batch to include an original sample and an attack sample, the configuring being based on an original retention probability and an attack application probability, the original sample is a learning sample to which a first target attack type among the at least one target attack type is not applied, and the attack sample is a learning sample to which the first target attack type is applied.

2. The watermarking model learning method of claim 1, wherein the first threshold number is one;

the earlier stage is an initial stage in which the learning starts; and the second threshold number is at least two.

3. The watermarking model learning method of claim 1, wherein the setting comprises randomly selecting the at least one target attack type from an attack type list according to a respective threshold number of the at least one target attack type of each corresponding stage among the at least two stages.

4. The watermarking model learning method of claim 1, wherein the configuring comprises:

selecting learning samples through random sampling from a dataset, the learning samples including the original sample and the attack sample; and generating the attack sample by applying the first target attack type to at least one of the learning samples.

5. The watermarking model learning method of claim 1, wherein the configuring comprises randomly setting target parameters within a parameter range of the first target attack type as learning samples to which the first target attack type is applied to obtain the respective learning batch, the learning samples including the attack sample.

6. The watermarking model learning method of claim 1, wherein the configuring comprises configuring the respective learning batch by generating a learning sample to which the at least one target attack type set to the later stage is applied.

7. The watermarking model learning method of claim 1, wherein the configuring comprises configuring the respective learning batch by generating a plurality of learning samples to which at least two target attack types are applied, at least one of a combination of the at least two target attack types or an application order of the at least two target attack types being different among the plurality of learning samples.

8. The watermarking model learning method of claim 1, wherein the configuring comprises configuring the respective learning batch by replacing a non-differentiable attack type with a differentiable attack type based on an approximation function, the non-differentiable attack type being among the at least one target attack type.

9. A non-transitory computer-readable recording medium storing program instructions that, when executed by at least one processor, cause the at least one processor to perform the watermarking model learning method of claim 1.

10. A computer device comprising:

at least one processor configured to execute computer-readable instructions included in a memory to cause the computer device to divide epochs for learning of a watermarking model into at least two stages, set at least one target attack type to each stage among the at least two stages, set a first threshold number of the at least one target attack type set to an earlier stage to be greater than a second threshold number of the at least one target attack type set to a later stage, and the at least two stages including the earlier stage and the later stage, and perform learning of the watermarking model based on the at least two stages, the at least one target attack type set to each stage among the at least two stages, the first threshold number and the second threshold number, wherein the at least one processor is configured to cause the computer device to configure a respective learning batch corresponding to the at least one target attack type set to each corresponding stage among the at least two stages, the at least one processor is configured to cause the computer device to configure the respective learning batch to include an original sample and an attack sample based on an original retention probability and an attack application probability, the original sample is a learning sample to which a first target attack type among the at least one target attack type is not applied, and the attack sample is a learning sample to which the first target attack type is applied.

11. The computer device of claim 10, wherein the first threshold number is one;

the earlier stage is an initial stage in which the learning starts; and the second threshold number is at least two.

12. The computer device of claim 10, wherein the at least one processor is configured to cause the computer device to randomly select the at least one target attack type from an attack type list according to a respective threshold number of the at least one target attack type of each corresponding stage among the at least two stages.

13. The computer device of claim 10, wherein the at least one processor is configured to cause the computer device to:

select learning samples through random sampling from a dataset, the learning samples including the original sample and the attack sample; and generate the attack sample by applying the first target attack type to at least one of the learning samples.

14. The computer device of claim 10, wherein the at least one processor is configured to cause the computer device to randomly set target parameters within a parameter range of the first target attack type as learning samples to which the first target attack type to obtain the respective learning batch, the learning samples including the attack sample.

15. The computer device of claim 10, wherein the at least one processor is configured to cause the computer device to configure the respective learning batch by generating a learning sample to which the at least one target attack type set to the later stage is applied.

16. The computer device of claim 10, wherein the at least one processor is configured to cause the computer device to configure the respective learning batch by generating a plurality of learning samples to which at least two target attack types are applied, at least one of a combination of the at least two target attack types or an application order of the at least two target attack types being different among the plurality of learning samples.

\* \* \* \* \*